Patented Sept. 27, 1932

1,879,606

UNITED STATES PATENT OFFICE

HENRY DREYFUS, OF LONDON, ENGLAND

MANUFACTURE OF ALIPHATIC ACIDS AND THEIR ESTERS

No Drawing. Application filed July 29, 1930, Serial No. 471,596, and in Great Britain October 1, 1929.

This invention relates to the manufacture of aliphatic acids and esters.

According to the invention I have now found that nonacidic catalysts capable of promoting the synthesis of aliphatic acids from aliphatic alcohols and carbon monoxide may be used with advantage for catalyzing the formation of aliphatic esters and acids from aliphatic ethers (e. g. dimethyl ether) and carbon monoxide.

As instances of the catalysts of the invention I may mention substances that are, or are capable of forming acetates which split off acetic acid at temperatures under about 400° to 450° C. and preferably between about 200° and 300° C.; for instance copper oxide, tin oxide, lead oxide, copper acetate, zinc oxide, zinc acetate, zinc methylate, aluminium methylate, tin methylate and like methylates, or mixtures of two or more of any of the foregoing with each other or mixtures of any of them with more basic materials such as potassium acetate or sodium acetate. Especially useful are mixtures of or containing one or more of the foregoing— and especially the said metal methylates— with one or more alkali methylates such as potassium methylate or sodium methylate. Any other nonacidic catalysts capable of promoting the synthesis of aliphatic acids from aliphatic alcohols and carbon monoxide may be employed for the reaction.

The reaction may, if desired, be performed under ordinary atmospheric pressure, but the reaction proceeds more rapidly under high pressures. The pressure may be as high as 100, 200 or 300 atmospheres or any higher pressure that can conveniently be attained in practice.

The reaction may be performed at ordinary temperatures but it is greatly accelerated by elevated temperatures. I preferably perform the reaction under pressure (e. g. under a pressure of 50 to 300 atmospheres or more) at temperatures over 100° C., e. g. from about 200° to 450° C., and preferably at temperatures of from about 300° to 400° C.

In performing the invention I may employ carbon monoxide as such or in the form of industrial gases or other gas mixtures containing mixtures of carbon monoxide and hydrogen, for instance, water gas, coke oven gas, producer gas, but I preferably employ carbon monoxide alone.

The catalysts may with advantage be employed, distributed over or supported on a solid carrier such for instance as coke, graphite or the like.

The reaction may be performed in any suitable vessels, for instance vessels made of or lined with copper, gold or other metals not liable to produce carbonyls by reaction with carbon monoxide.

The carbon monoxide and dimethyl ether (or other aliphatic ether) may be submitted to the reaction in any convenient way. Conveniently the process may be carried out in a continuous manner by mixing the carbon monoxide (or gas containing the same) with dimethyl ether vapour and passing the mixture under the desired pressure into a reaction vessel containing one or more of the said catalysts (e. g. one or more substances which are, or which are capable of forming acetates which split off acetic acid at temperatures under 400° C.), the reaction vessel being heated to a temperature of about 250° to 400° C. and preferably 300° to 400° C.

The reaction of the invention enables the aliphatic acids to be produced in the form of their esters and/or in the free state, according to the quantity of water present, the catalysts employed and the conditions obtaining. The presence of water favours the production of the free acids whereas the absence of water (or presence of small quantities of water) and the presence of excess aliphatic ether favours the production of an aliphatic ester. The use of catalysts of the before mentioned substances which are, or which are capable of forming, acetates which split off acetic acid at temperatures under about 400–450° C. favours the production of free acids, especially when the reaction is performed in presence of water.

If the reaction is so conducted as to produce substantial quantities of methyl acetate (or other aliphatic ester), the ester may be saponified and worked up into the free acid by any convenient process, such for instance as by the process described in previous British Patent No. 284,582.

The process of the invention may be carried into effect in many different ways.

According to one convenient method of performing the invention I may, for example, use a closed train of apparatus comprising a gas circulating pump, which drives the carbon monoxide (or the gas containing the same), first through a mixing chamber where the aliphatic ether (e. g. dimethyl ether), alone or together with water, is incorporated with the gas in the form of vapour. The resulting gaseous mixture then passes through a heat exchanger into the reaction chamber. The products issuing from the reaction chamber pass through the heat exchanger to a condenser provided with a receiver, in which the uncondensable gases are separated from the liquid products. The liquid products are returned to the gas circulating pump. The catalyst may be charged into the reaction chamber in any convenient manner, for instance, the chamber may be filled with balls, pieces or stones of a filling material (e. g. pumice, graphite, coke) upon which the catalyst or catalysts are deposited or spread.

The different parts of the apparatus are preferably protected against corrosion by carbon monoxide and acetic acid (or other aliphatic acid present). Thus, for example, it is preferable to avoid the exposure of the gases to the action of iron in the apparatus, although special alloys that will not form iron carbonyl can be used with advantage. Parts of the apparatus in contact with the aliphatic acid may be made of or lined with any metal or substance not liable to attack by the acid, for instance copper. As will of course be understood, parts of the apparatus in contact with both acid and carbon monoxide should be made of or lined with a material (e. g. copper, gold, graphite) capable of resisting the action of both substances.

As before mentioned the reaction of the invention enables the aliphatic acid to be produced in the free state and/or in the form of its esters. In cases where the reaction is conducted to produce the ester or mixtures of acid and ester and it is desired to saponify the ester to produce the free acid, such saponification can be performed continuously with the reaction or otherwise.

For instance the saponification may be performed by the process described in United States application Serial No. 138,116, filed September 27th, 1926, and British Patent No. 284,582 by which means the saponification of esters of aliphatic acids can be performed in such manner as to produce free acids in the anhydrous condition. The said process consists in effecting the saponification by means of just the theoretical amount of water required for the reaction, a strong mineral acid, e. g. phosphoric or sulphuric acid, being used as the saponifying agent.

The saponification by such process yields the aliphatic acid together with the aliphatic ether, e. g. in the case of methyl acetate, acetic acid and dimethyl ether, and the aliphatic ether so produced may, if desired, be submitted to the process of the present invention to produce further quantities of the aliphatic ester or acid. In such method of saponification it is preferred to use phosphoric acid as saponifying agent.

The reaction takes place at temperatures between about 150° and 300° C., temperatures between 180° and 220° C. being especially advantageous.

The more highly hydrated forms of phosphoric acid, for instance, ortho-phosphoric acid and pyrophosphoric acid, are capable of supplying the water required for the saponification, being themselves at the same time dehydrated to the form of metaphosphoric acid. It is therefore possible to perform the reaction in a continuous manner, by continuously introducing supplies of ester and water in the requisite proportions into the phosphoric acid, the phosphoric acid serving in effect as a carrier for the water.

The saponification may be carried out in any apparatus designed for the interaction of gas and liquids, e. g. wash towers, mixers, bubblers, etc.

The saponification of the ester can be carried out continuously with the production thereof. Thus for instance in cases where the products of the reaction of the present invention consist largely or entirely of the aliphatic acid in the form of an ester, the reaction products may be passed continuously in the vapour state and in admixture with the requisite quantity of steam through a chamber containing phosphoric acid maintained at a temperature between about 180° and 250° C. In cases where the reaction of the invention is performed under elevated pressures it is preferable to expand the reaction products to a lower pressure (e. g. atmospheric pressure) prior to passing them in contact with the phosphoric acid.

The following examples serve to illustrate convenient forms of execution of the invention, it being understood that they are given only by way of illustration and are in no way limitative.

*Example 1*

A mixture of dimethyl ether and carbon monoxide containing about 5 parts by weight of dimethyl ether and 3 parts by weight of carbon monoxide is passed under pressure of about 100 to 200 atmospheres through a reaction vessel heated to a temperature between 300 and 400° C., the reaction vessel being lined with copper and filled with a catalyst mass composed of granules of zinc oxide or tin oxide or of a mixture of zinc oxide or tin oxide and sodium methylate. The reaction products are then condensed to separate the acetic acid, which is present almost completely in the form of methyl acetate.

*Example 2*

A gaseous mixture composed of about 5 parts by weight of dimethyl ether, and about 4 parts of carbon monoxide and 3 to 5 parts of steam is subjected to the reaction precisely in the manner described in Example 1. The reaction products are then condensed to separate the acetic acid which is present largely or entirely in the form of free acetic acid.

What I claim and desire to secure by Letters Patent is:—

1. A process for the manufacture of an aliphatic acyl compound which comprises subjecting an ether of formula $(C_nH_{2n+1})_2O$ to the action of carbon monoxide in presence of a non-acidic catalyst capable of promoting the synthesis of aliphatic acids from carbon monoxide and aliphatic alcohols.

2. Process for the manufacture of an aliphatic acyl compound which comprises subjecting an ether of formula $(C_nH_{2n+1})_2O$ to the action of carbon monoxide in presence of a catalyst selected from the group consisting of metal acetates which decompose with the formation of acetic acid at a temperature under 450° C. and metal compounds capable of forming said acetates.

3. Process for the manufacture of an aliphatic acyl compound which comprises subjecting an ether of formula $(C_nH_{2n+1})_2O$ to the action of carbon monoxide in presence of a catalyst composed of zinc oxide.

4. Process for the manufacture of an aliphatic acyl compound which comprises subjecting an ether of formula $(C_nH_{2n+1})_2O$ to the action of carbon monoxide in presence of a catalyst composed of tin oxide.

5. Process according to claim 1, and wherein the reaction is performed at a temperature between 200° and 450° C.

6. Process according to claim 1, and wherein the reaction is performed at a temperature between 200° and 450° C. and under a pressure of at least 50 atmospheres.

7. Process according to claim 1, and wherein the reaction is performed in presence of water vapor.

8. Process for the manufacture of an aliphatic acyl compound which comprises subjecting a gaseous mixture of aliphatic ether of formula $(C_nH_{2n+1})_2O$, carbon monoxide and steam to a temperature between 200° and 450° C. and a pressure of at least 50 atmospheres in presence of a non-acidic catalyst capable of promoting the synthesis of aliphatic acids from carbon monoxide and aliphatic alcohols.

9. Process for the manufacture of an aliphatic acyl compound which comprises subjecting a gaseous mixture of aliphatic ether of formula $(C_nH_{2n+1})_2O$, carbon monoxide and steam to a temperature between 200° and 450° C. and a pressure of at least 50 atmospheres in presence of a catalyst selected from the group consisting of metal acetates which decompose with the formation of acetic acid at a temperature under 450° C. and metal compounds capable of forming said acetates.

10. Process for the manufacture of an acetyl compound, which comprises subjecting dimethyl ether to the action of carbon monoxide in presence of a non-acidic catalyst capable of promoting the synthesis of aliphatic acids from carbon monoxide and aliphatic alcohols.

11. Process for the manufacture of an acetyl compound, which comprises subjecting dimethyl ether to the action of carbon monoxide in presence of a catalyst selected from the group consisting of metal acetates which decompose with the formation of acetic acid at a temperature under 450° C. and metal compounds capable of forming said acetates.

12. Process for the manufacture of an acetyl compound which comprises subjecting dimethyl ether to the action of carbon monoxide in presence of a catalyst composed of zinc oxide.

13. Process for the manufacture of an acetyl compound which comprises subjecting dimethyl ether to the action of carbon monoxide in the presence of a catalyst composed of tin oxide.

14. Process for the manufacture of an acetyl compound, which comprises subjecting dimethyl ether to the action of carbon monoxide at a temperature between 200° and 450° C. and a pressure of at least 50 atmospheres in presence of a non-acidic catalyst capable of promoting the synthesis of aliphatic acids from carbon monoxide and aliphatic alcohols.

15. Process for the manufacture of an acetyl compound, which comprises subjecting a mixture of dimethyl ether, carbon monoxide and steam to a temperature between 200° and 450° C. and a pressure of at least 50 atmospheres in presence of a non-acidic catalyst capable of promoting the synthesis of aliphatic acids from carbon monoxide and aliphatic alcohols.

16. Process for the manufacture of an acetyl compound, which comprises subjecting a mixture of dimethyl ether, carbon monoxide and steam to a temperature between 200° and 450° C. and a pressure of at least 50 atmospheres in presence of a catalyst selected from the group consisting of metal acetates which decompose with the formation of acetic acid at a temperature under 450° C. and metal compounds capable of forming said acetates.

17. Process for the manufacture of methyl acetate, which comprises subjecting a mixture of dimethyl ether and carbon monoxide containing 5 parts by weight of dimethyl ether and 3 parts by weight of carbon monoxide to a temperature between 300° and 400° C. and a pressure of 100–200 atmospheres in presence of a catalyst composed of zinc oxide.

18. Process for the manufacture of acetic acid, which comprises subjecting a mixture of 5 parts by weight of dimethyl ether, 4 parts by weight of carbon monoxide and 3–5 parts of steam to a temperature between 300° and 400° C. and a pressure of 100–200 atmospheres in presence of a catalyst composed of zinc oxide.

In testimony whereof I have hereunto subscribed my name.

HENRY DREYFUS.